(12) United States Patent
Clifton et al.

(10) Patent No.: US 10,073,783 B2
(45) Date of Patent: Sep. 11, 2018

(54) DUAL MODE LOCAL DATA STORE

(71) Applicant: Advanced Micro Devices, Inc., Sunnyvale, CA (US)

(72) Inventors: Daniel Clifton, Chuluota, FL (US); Michael J. Mantor, Orlando, FL (US); Hans Burton, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/360,205

(22) Filed: Nov. 23, 2016

(65) Prior Publication Data
US 2018/0143907 A1    May 24, 2018

(51) Int. Cl.
*G06F 12/08* (2016.01)
*G06F 12/0846* (2016.01)
*G06F 9/38* (2018.01)

(52) U.S. Cl.
CPC ........ *G06F 12/0848* (2013.01); *G06F 9/3887* (2013.01); *G06F 2212/282* (2013.01)

(58) Field of Classification Search
CPC ............................ G06F 12/0848; G06F 9/3887
See application file for complete search history.

(56) References Cited

U.S. PATENT DOCUMENTS

| | | | |
|---|---|---|---|
| 5,265,232 A | 11/1993 | Gannon et al. | |
| 5,584,017 A | 12/1996 | Pierce et al. | |
| 6,044,446 A | 3/2000 | Joy et al. | |
| 6,868,485 B1 | 3/2005 | Conway | |
| 7,023,445 B1 | 4/2006 | Sell | |
| 7,047,322 B1 | 5/2006 | Bauman et al. | |
| 7,096,323 B1 | 8/2006 | Conway et al. | |
| 7,472,253 B1 | 12/2008 | Cameron et al. | |
| 7,669,011 B2 | 2/2010 | Conway | |
| 8,667,200 B1 | 3/2014 | Muliadi et al. | |

(Continued)

FOREIGN PATENT DOCUMENTS

WO    2009145917 A1    12/2009

OTHER PUBLICATIONS

European Search Report in European Application No. 16203672.7, dated Jun. 26, 2017, 4 pages.

(Continued)

*Primary Examiner* — Edward J Dudek, Jr.
(74) *Attorney, Agent, or Firm* — Meyertons Hood Kivlin Kowert and Goetzel PC; Rory D. Rankin

(57) ABSTRACT

A system and method for efficiently processing access requests for a shared resource are described. Each of many requestors are assigned to a partition of a shared resource. When a controller determines no requestor generates an access request for an unassigned partition, the controller permits simultaneous access to the assigned partitions for active requestors. When the controller determines at least one active requestor generates an access request for an unassigned partition, the controller allows a single active requestor to gain exclusive access to the entire shared resource while stalling access for the other active requestors. The controller alternatives exclusive access among the active requestors. In various embodiments, the shared resource is a local data store in a graphics processing unit and each of the multiple requestors is a single instruction multiple data (SIMD) compute unit.

20 Claims, 5 Drawing Sheets

(56) References Cited

U.S. PATENT DOCUMENTS

2007/0022255 A1    1/2007  Cantin et al.
2009/0300621 A1*  12/2009  Mantor .............. G06F 9/30087
                                                                         718/100
2015/0310900 A1*  10/2015  Schaub ................. G09G 5/363
                                                                         711/106

OTHER PUBLICATIONS

Communication pursuant to Article 94(3) in European Application No. 16203672.7, dated Aug. 14, 2017, 7 pages.
Moshovos; "RegionScout: Exploiting Coarse Grain Sharing in Snoop-Based Coherence"; Computer Architecture, 2005. ISCA '05. Proceedings. 32nd International Symposium on Computer Architecture; Jun. 4-8, 2005; pp. 234-245.
Cantin; "Coarse-Grain Coherence Tracking;" Dissertation; University of Wisconsin at Madison; Jan. 2006.
Cantin, et al; "Coarse-Grain Coherence Tracking: Regionscout and Region Coherence Arrays," IEEE Micro, vol. 26, No. 1, pp. 70-79, Jan./Feb. 2006.

* cited by examiner

DUAL MODE LOCAL DATA STORE

BACKGROUND

Description of the Relevant Art

The parallelization of tasks is used to increase the throughput of computer systems. To this end, compilers or the software programmer extract parallelized tasks from program code to execute in parallel on the system hardware. Out-of-order execution, deep pipelines, speculative execution and multi-threaded execution are used to exploit instruction level parallelism, and thus, increase throughput. To further increase parallel execution on the hardware, a parallel architecture processor is included in the system to exploit data level parallelism and offload computationally intensive and repetitive tasks from conventional general-purpose processors. Examples of these tasks include video graphics rendering, cryptography, garbage collection and other vector instruction applications.

Various examples of the above systems exploiting data level parallelism include a single instruction multiple data (SIMD) processor as the parallel architecture processor. A graphics processing unit (GPU) is one example of a SIMD processor. The GPU includes one or more SIMD compute units, each with multiple lanes of processing resources for executing instructions of a respective thread. The instructions are the same in the threads executing across the lanes but with data elements particular to a given lane. An operating system scheduler or a programmer via a software programming platform schedules the threads on the lanes of the SIMD compute units.

Without the use of a local data store, the result data generated by a given lane within the SIMD compute unit is inaccessible to other lanes without costly latencies of storing and retrieving the result data to other forms of data storage. Although the multiple lanes of the SIMD compute unit share the local data store, systems do not provide an architecture that allows the number of lanes to dynamically change, and thus, alter the amount of storage to share within the local data store. Therefore, the systems do not support conflict resolution and full accessibility (addressability) of the local data store.

In view of the above, efficient methods and systems for efficiently processing access requests for a shared resource are desired.

Figure 1:
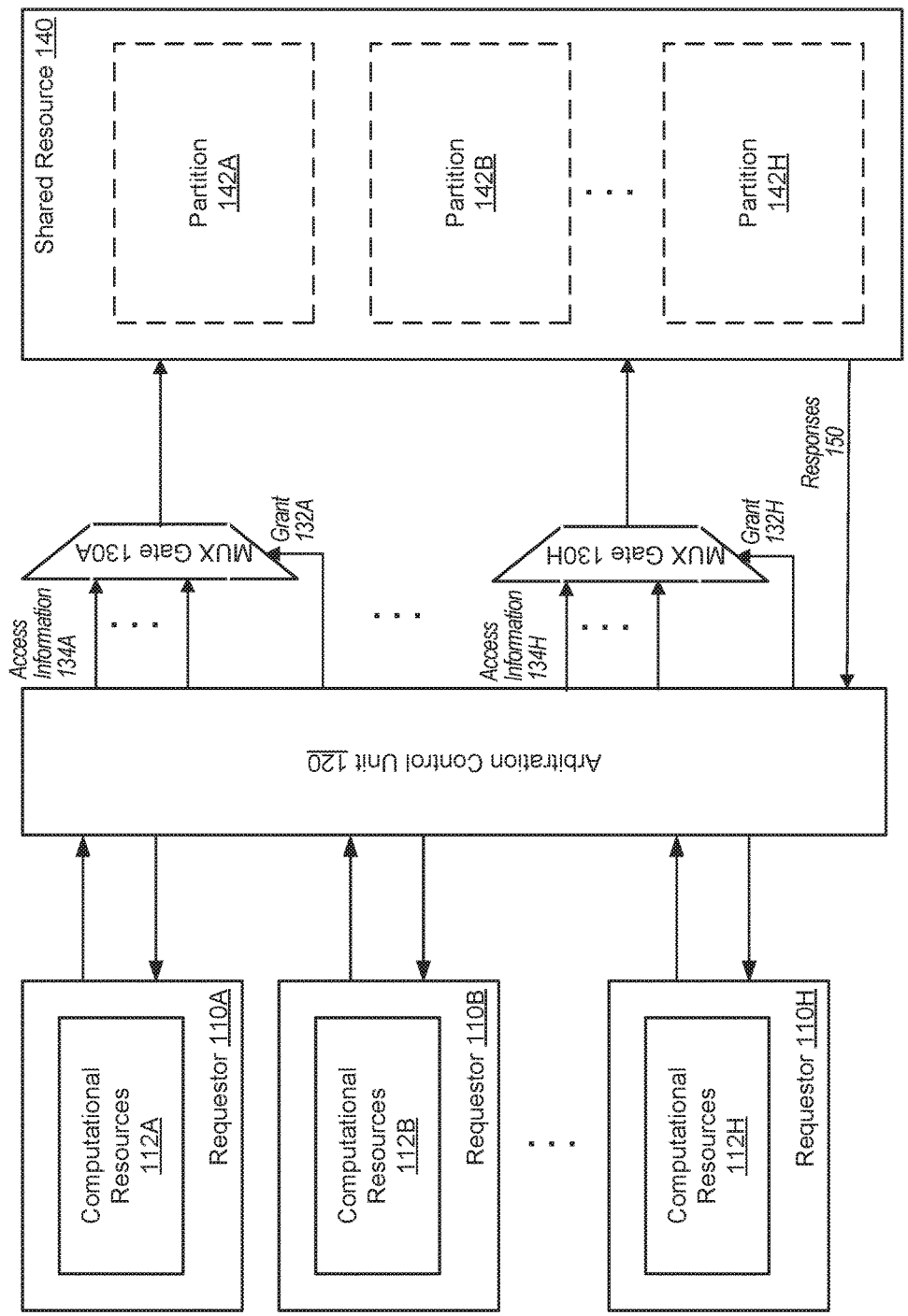
FIG. 1 is a generalized diagram of one embodiment of a computing system supporting access of a shared resource.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently processing access requests for a shared resource are contemplated. In various embodiments, each of many requestors are assigned to a partition of a shared resource. In some embodiments, each partition is a separate partition, which is non-overlapping with other partitions of the shared resource. A controller is used to support access to the shared resource. When the controller determines no requestor generates an access request for an unassigned partition, the controller permits simultaneous access to the assigned partitions for active requestors. However, when the controller determines at least one active requestor generates an access request for an unassigned partition, the controller allows a single active requestor to gain access to the entire shared resource while stalling access for the other active requestors.

The controller performs arbitration by selecting an active requestor. In some embodiments, the selection is based on least recently used criteria. The controller stalls access of the shared resource for unselected requestors while permitting access for the selected requestor. In some embodiments, the controller sets a limit on a number of access requests performed for the selected requestor or sets a limit on an amount of time for performing access requests for the selected requestor such as a number of clock cycles. If the active requestors have more access requests, the controller stalls access of the shared resource for the selected requestor and marks it as the most recently selected active requestor. Afterward, the controller deselects the requestor and again performs arbitration by selecting another active requestor to have exclusive access to the entire shared resource.

In various embodiments, the shared resource is a local data store in a graphics processing unit and each of the multiple requestors is a single instruction multiple data (SIMD) compute unit. In some embodiments, the controller detects access requests to unassigned partitions by detecting accesses to regions of the local data store external to the assigned memory address boundaries for the SIMD compute units. In various embodiments, when a given SIMD compute unit has exclusive access to the entire local data store, it has exclusive access for a single clock cycle before arbitration reoccurs and another SIMD compute unit gains exclusive access. However, another number of clock cycles is possible and contemplated. Alternatively, in other embodiments, the controller monitors a number of access requests and when the number reaches a limit, arbitration reoccurs. In various embodiments, each SIMD compute unit includes read and write ports to the local data store, which are used to provide access to the local data store for another SIMD compute unit when the other SIMD compute unit has exclusive access to the local data store.

Turning to FIG. 1, a generalized block diagram of one embodiment of a computing system supporting access of a shared resource is shown. In the shown embodiment, the computing system includes requestors 110A-110H accessing the shared resource 140 via the arbitration control unit 120. In some embodiments, the shared resource 140 is a shared memory and the arbitration control unit 120 is a memory controller. In other embodiments, the shared resource 140 is a unit with specific intensive computational functionality or a unit for providing switching access to a network. Other examples of a resource and any associated controller are possible and contemplated.

The requestors 110A-110H include the computation resources 112A-112H. In various embodiments, the computational resources 112A-112H include pipeline registers, data structures for storing intermediate results, circuitry for performing integer arithmetic, floating-point arithmetic, Boolean logic operations, branch condition comparisons and so forth. As shown, the shared resource 140 is partitioned into multiple partitions 142A-142H. In some embodiments, each of the partitions 142A-142H includes a same amount of data storage, a same amount of intensive computational functionality and so forth. In other embodiments, one or more of the partitions 142A-142H includes less or more data storage or intensive computational functionality than other ones of the partitions 142A-142H.

In various embodiments, each of the partitions 142A-142H is a separate partition which does not overlap with any other partition of the partitions 142A-142H. In other embodiments, overlapping is used. In various embodiments, each partition of the partitions 142A-142H is assigned to one of the computational resources 112A-112H. In other embodiments, two or more of the computational resources 112A-112H are assigned to a same one of the partitions 142A-142H.

In some embodiments, the assignments between the computational resources 112A-112H and the partitions 142A-142H in addition to the sizes of the partitions 142A-142H are set by programmable control and status registers (not shown). Firmware, an executing software application or other software is used to update the control and status registers to initially assign and subsequently reassign the computational resources 112A-112H to the partitions 142A-142H and the sizes of the partitions 142A-142H. In other embodiments, control logic implemented by hardware circuitry within the requestors 110A-110H and/or the arbitration control unit 120 performs the initial assignment and sizing and subsequent reassignments and resizing.

As one or more of the computational resources 112A-112H process instructions of one or more applications, one or more of the requestors 110A-110H generate access requests for the shared resource 140. In various embodiments, the generated access requests identify one of the partitions 142A-142H. By identifying one of the partitions 142A-142H, the generated access request targets the identified partition. The targeted partition is either an assigned partition or an unassigned partition.

If no access request generated by the requestors 110A-110H target an unassigned one of the partitions 142A-142H, then the access requests are serviced based on the assignments. Each access request is permitted by the arbitration control unit 120 to access its assigned partition. The selection logic implemented by the multiplexer ("mux") gates 130A-130H selects access information 134A-134H based on the grant signal(s) 132A-132H. The grant signal(s) 132A-132H are asserted by the arbitration control unit 120 in a manner to select the assigned one of the requestors 110A-110H based on the earlier set assignments. Therefore, the partitions 142A-142H are accessed by its assigned one of the requestors 110A-110H. In various embodiments, two or more of the partitions 142A-142H are accessed simultaneously when there are no conflicts based on the assignments.

If any access request generated by the requestors 110A-110H targets an unassigned one of the partitions 142A-142H, then the requestors 110A-110H gain exclusive access to the partitions 142A-142H. The exclusive access occurs based on arbitration provided by the arbitration control unit 120. For example, in various embodiments, each active requestor of the requestors 110A-110H gains exclusive access for a clock cycle based on a least recently selected basis. In other embodiments, a number of clock cycles or a number of access requests is used by the arbitration control unit 120 to determine when to allow another active requestor of the requestors 110A-110H to gain exclusive access to the partitions 142A-142H.

In some embodiments, the computing system includes a hybrid arbitration scheme wherein the arbitration control unit 120 includes a centralized arbiter and one or more of the requestors 110A-110H include distributed arbitration logic. For example, one or more of the requestors 110A-110H includes an arbiter for selecting a given request to send to the arbitration control unit 120 from multiple requests generated by multiple sources within the computational resources 112A-112H. The arbitration control unit 120 selects one or more requests to send to the shared resource 140 from multiple requests received from the requestors 110A-110H. The grant signals 132A-132H are asserted based on the received requests and detecting whether any received request targets an assigned one of the partitions 142A-142H. In addition, in some embodiments, the arbitration control unit 120 adjusts the number of clock cycles or the number of access requests for exclusive access to the shared resource 140 based on an encoded priority along with the least-recently-selected scheme.

Responses 150 for the requests are shown as being sent back to the arbitration control unit 120. In other embodiments, the responses 150 are sent directly to the requestors 110A-110H such as via a bus. In some embodiments, polling logic within the interfaces of the requestors 110A-110H is used to retrieve associated response data 150 from the bus or the arbitration control unit 120. In various other embodiments, the responses 150 are sent to other computational units (not shown) within the computing system.

Figure 2:
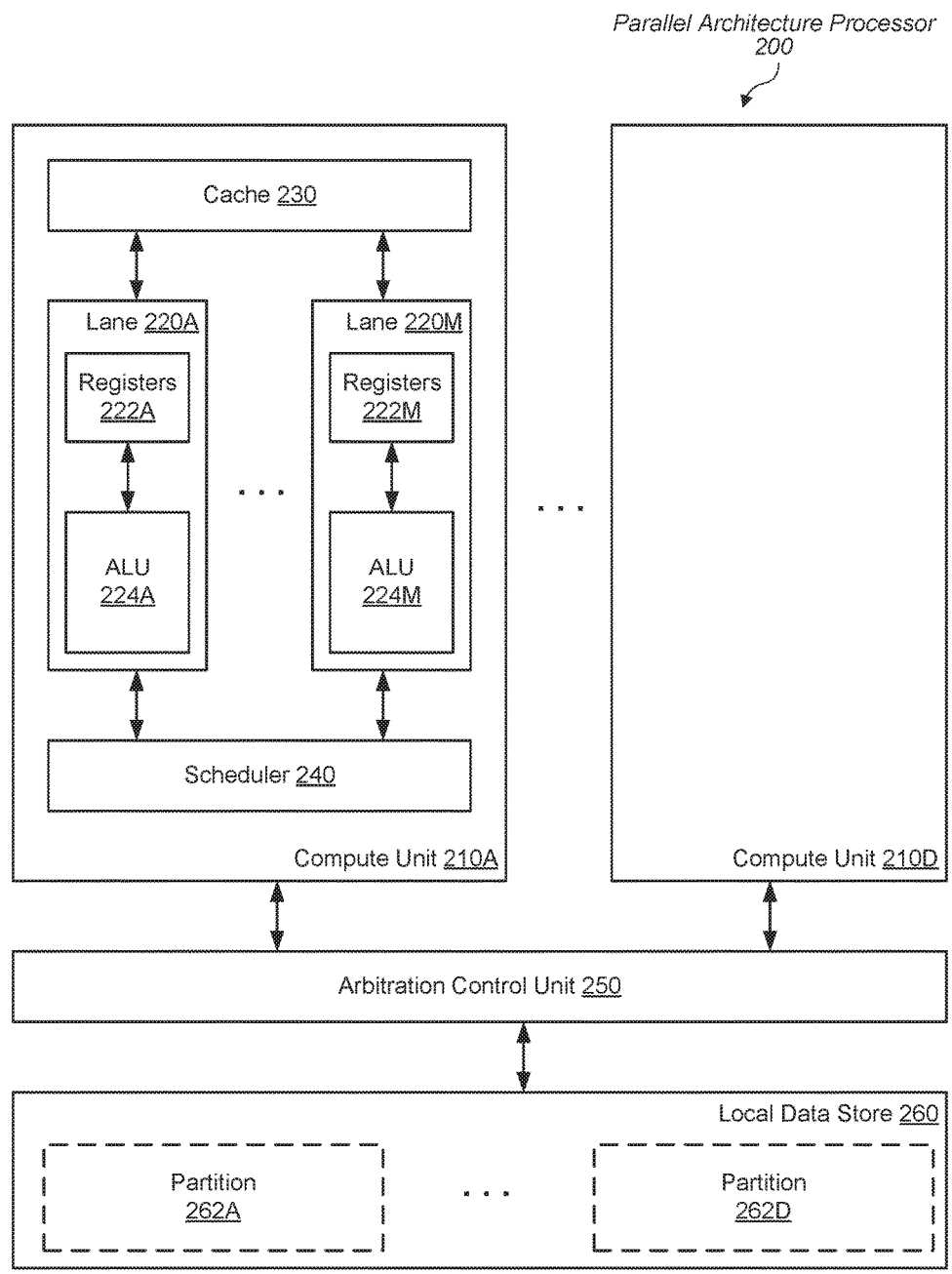
FIG. 2 is a generalized diagram of one embodiment of a parallel architecture processor.

Referring now to FIG. 2, one embodiment of a parallel architecture processor 200 is shown. In various embodiments, the parallel architecture processor 200 is a graphics processing unit (GPU) with compute units 210A-210D accessing the local data store 260 via the arbitration control unit 250. Generally, a GPU includes a separate local data share for each of the compute units 210A-210D for sharing data among the lanes 220A-220M. Here, however, the local data share 260 is shared among the compute units 210A-210D. Therefore, it is possible for one or more of lanes 220A-220M within the compute unit 210A to share result data with one or more lanes 220A-220M within the compute unit 210D based on an operating mode.

As described earlier, the parallel architecture processor 200 includes special-purpose integrated circuitry optimized for highly parallel data applications such as single instruction multiple data (SIMD) operations. In various embodiments, the parallel architecture processor 200 is a graphics processing unit (GPU) used for video graphics rendering. As shown, each of the lanes 220A-220M within the compute unit 210A comprises registers 222A and an arithmetic logic unit (ALU) 224A. Lanes within other compute units of the compute units 210A-210D also include similar components. In various embodiments, the registers 222A are storage elements used as a register file for storing operands and results.

In various embodiments, the data flow within the ALU 224A is pipelined. The ALU 224A includes pipeline registers, data structures for storing intermediate results and circuitry for performing integer arithmetic, floating-point arithmetic, Boolean logic operations, branch condition comparisons and so forth. These components are not shown for ease of illustration. Each of the computation units within a given row across the lanes 220A-220M is the same computation unit. Each of these computation units operates on a same instruction, but different data associated with a different thread.

Each of the lanes 220A-220M within the compute unit 210A accesses the cache 230 for instructions. In addition, the cache 230 stores operand data to load into the registers 222A. For embodiments performing video graphics rendering, the cache 230 is referred to as a level one (L1) texture cache. Each of the compute units 210A-210D has further access to a shared L2 cache (not shown) which acts as a global data share for the compute units 210A-210D. For example, in various embodiments, each of the compute units 210A-210D includes a cache controller placed logically at the top above the cache 230 to store and retrieve data from the shared L2 cache.

As described earlier, each of the lanes 220A-220M processes data for a separate thread. Each of the compute units 210A-210D processes threads for a given work unit. An operating system (OS) scheduler or a user-level scheduler schedules workloads running on a computer system with the parallel architecture processor 200 using a variety of schemes such as a round-robin scheme, a priority scheme, an availability scheme or a combination. Alternatively, a programmer schedules the workloads in combination with the runtime system. In such a case, the programmer utilizes a software platform to perform the scheduling. For example, the OpenCL® (Open Computing Language) framework supports programming across heterogeneous computing environments and includes a low-level application programming interface (API) for heterogeneous computing.

The OpenCL framework (generally referred to herein as "OpenCL") includes a C-like language interface used to define execution queues, wherein each queue is associated with an OpenCL device. An OpenCL device may be a general-purpose central processing unit (CPU), a GPU, or other unit with at least one processor core within a heterogeneous multi-core architecture. In the OpenCL framework a function call is referred to as an OpenCL compute kernel, or simply a "compute kernel". A software programmer schedules the compute kernels in the execution queues. A compute kernel is matched with one or more records of data to produce one or more work units of computation. Each work unit has a unique identifier (ID). Each of the compute units 210A-210D is assigned one of the many work units by the OS or by the software programmer. Each of the lanes 220A-220M within a given one of the compute units 210A-210D is assigned a thread within the assigned work unit.

Each of the lanes 220A-220M accesses the local data share 260. For example, in various embodiments, each of the lanes 220A-220M has allocated space within the local data share 260. Each of the lanes 220A-220M within a given one of the compute units 210A-210D has access to the allocated space of the other lanes within the same given compute unit. For example, lane 220A within the compute unit 210A has access to the allocated space within the local data store 260 assigned to the lane 220M within the compute unit 210A. The lanes 220A-220M within the compute unit 210A have access each other's allocated space due to processing a same work unit.

The requests generated by each of the lanes 220A-220M seek to access a block of data. In various embodiments, the block of data, or data block, is a set of bytes stored in contiguous memory locations. The number of bytes in a data block is varied according to design choice, and may be of any size. The scheduler 240 is used to schedule the access requests generated by the lanes 220A-220M within the compute unit 210A. The generated access requests are sent from the scheduler 240 to the local data store 260 via the arbitration control unit 250.

As shown, the local data share 260 is divided into multiple partitions 262A-262D. In various embodiments, each of the partitions 262A-262D is a separate partition which does not overlap with any other partition of the partitions 262A-262D. In some embodiments, each of the partitions 262A-262D includes a same amount of data storage. In other embodiments, one or more of the partitions 262A-262D includes less or more data storage than other ones of the partitions 262A-262D.

In various embodiments, the assignments between the compute units 210A-210D and the partitions 262A-262D in addition to the sizes of the partitions 262A-262D are set by an operating system, a software programmer, a dedicated control unit or other. For example, in some embodiments, programmable control and status registers (not shown) store particular values to set the assignments. Firmware, an executing software application or other software is used to update the control and status registers to initially assign and subsequently reassign the compute units 210A-210D and the partitions 262A-262D in addition to defining the sizes of the partitions 262A-262D. In other embodiments, control logic implemented by hardware circuitry within the compute units 210A-210D and/or the arbitration control unit 250 performs the initial assignment, subsequent reassignments and resizing.

In various embodiments, the arbitration control unit 250 is used to provide shared memory capability across the compute units 210A-210D. For example, in various embodiments, threads of a same work unit are scheduled across two or more of the compute units 210A-210D, rather than scheduled to a single one of the compute units 210A-210D. For efficient processing, communication between the lanes should expand beyond a single one of the compute units 210A-210D.

In one example, the compute unit 210A is assigned to the partition 262A and the compute unit 210D is assigned to the partition 262D. However, later, threads of a same work unit are scheduled across the two compute units 210A and 210D. It is now possible for efficient execution that one or more of the lanes 220A-220M in the compute unit 210A needs to communicate with one or more lanes 220A-220M in the compute unit 210D. The arbitration control unit 250 identifies this situation and provides exclusive access to the local data store 260 for a selected one of the compute units 210A and 210D.

The compute unit selected by the arbitration control unit 250 has exclusive access for a given duration of time. In various embodiments, the given duration is a single clock cycle. Therefore, in the above example, the compute units 210A and 210D alternate having exclusive access of the local data store 260 each clock cycle. In various embodiments, the given duration is programmable. In other embodiments, the duration is measured based on another number of clock cycles. In yet other embodiments, the given duration is measured based on a number of access requests, an encoded priority, an identifier (ID) of the requestor, an ID of a destination for the response data, a least-recently-selected scheme, and so forth. Further details of the logic used by the arbitration control unit 250 is next described.

Figure 3:
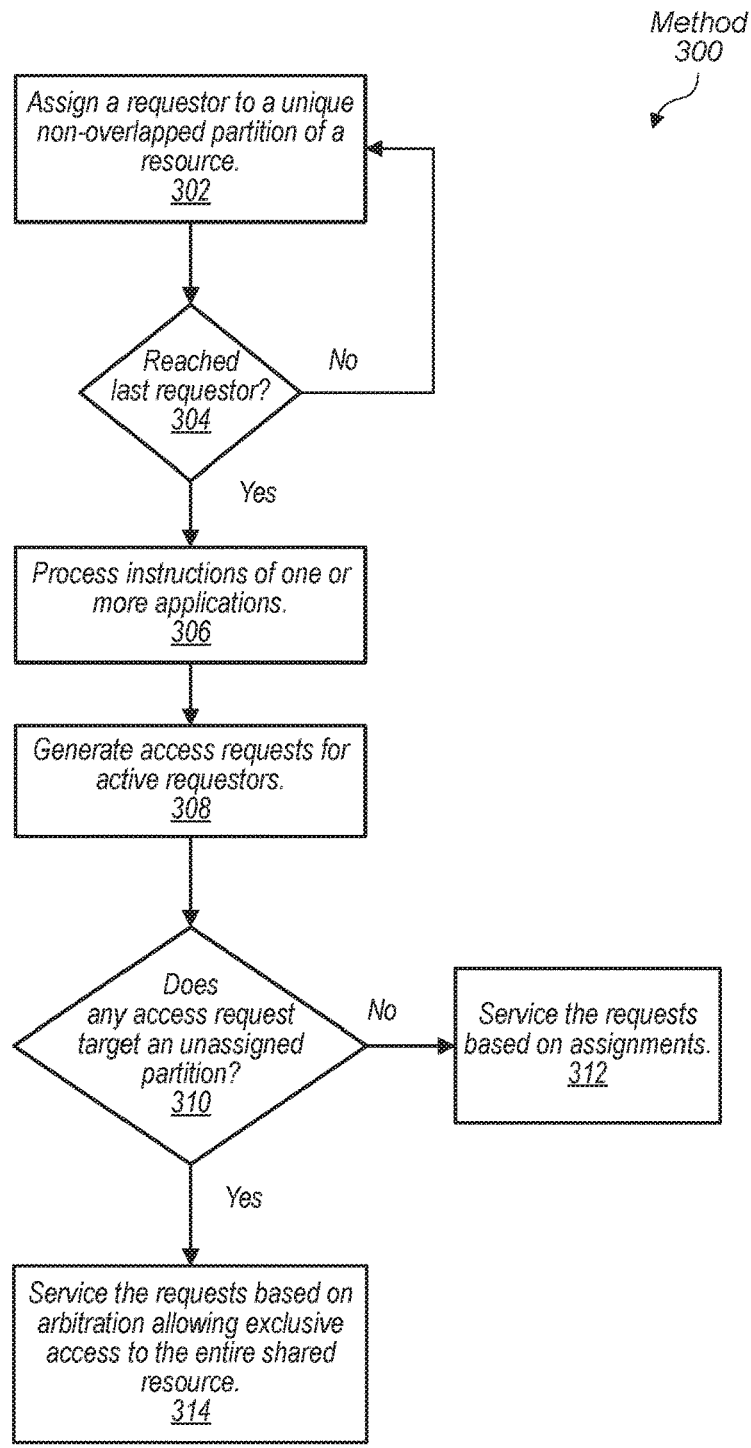
FIG. 3 is a generalized diagram of one embodiment of a method for processing access requests targeting a shared resource.

Referring now to FIG. 3, one embodiment of a method 300 for processing access requests targeting a shared resource is shown. For purposes of discussion, the steps in this embodiment (as well as in FIGS. 4-5) are shown in sequential order. However, in other embodiments some steps occur in a different order than shown, some steps are performed concurrently, some steps are combined with other steps, and some steps are absent.

In various embodiments, multiple requestors are set up in a computing system to access a shared resource. The shared resource is divided into multiple partitions. Part of the setup process is assigning each of the multiple requestors to one of the multiple partitions (block 302). The assignments are based on logic implemented in hardware, software or a combination. An operating system, a software programmer, a dedicated control unit or other performs the assignments. In addition, in some embodiments, the sizes of the partitions are also set during the setup process. When the last requestor is reached for assignment ("yes" branch of the conditional block 304), instructions of one or more software applications are processed by the computing system (block 306).

During the processing of the one or more software applications, the active requestors generate access requests for the shared resource (block 308). In various embodiments, the generated access requests identify one of the multiple partitions. In some embodiments, the identification includes an identifier (ID) of a partition. In other embodiments, an indication, such as a field or encoding, indirectly identifies the partition and control logic determines the identification based on the indication. In yet other embodiments, an address indirectly identifies the partition by indicating a data storage location within a given address range associated with the partition. By identifying one of the multiple partitions, the generated access request targets the identified partition. The targeted partition is either an assigned partition or an unassigned partition.

If no generated access requests target an unassigned partition ("no" branch of the conditional block 310), then the access requests are serviced based on the assignments (block 312). Each access request is permitted to access its assigned partition. However, if any generated access request targets an unassigned partition ("yes" branch of the conditional block 310), then the access requests are serviced based on the arbitration allowing exclusive access to the entire shared resource (block 314). For example, each one of the active requestors gains exclusive access to the entire shared resource for a given duration. In various embodiments, the given duration is measured based on a number of clock cycles. In other embodiments, the given duration is measured based on a number of access requests. In various embodiments, the given duration is programmable. In some embodiments, the given duration is further based on an encoded priority, an identifier (ID) of the requestor, an ID of a destination for the response data, a least-recently-selected scheme, and so forth.

Figure 4:
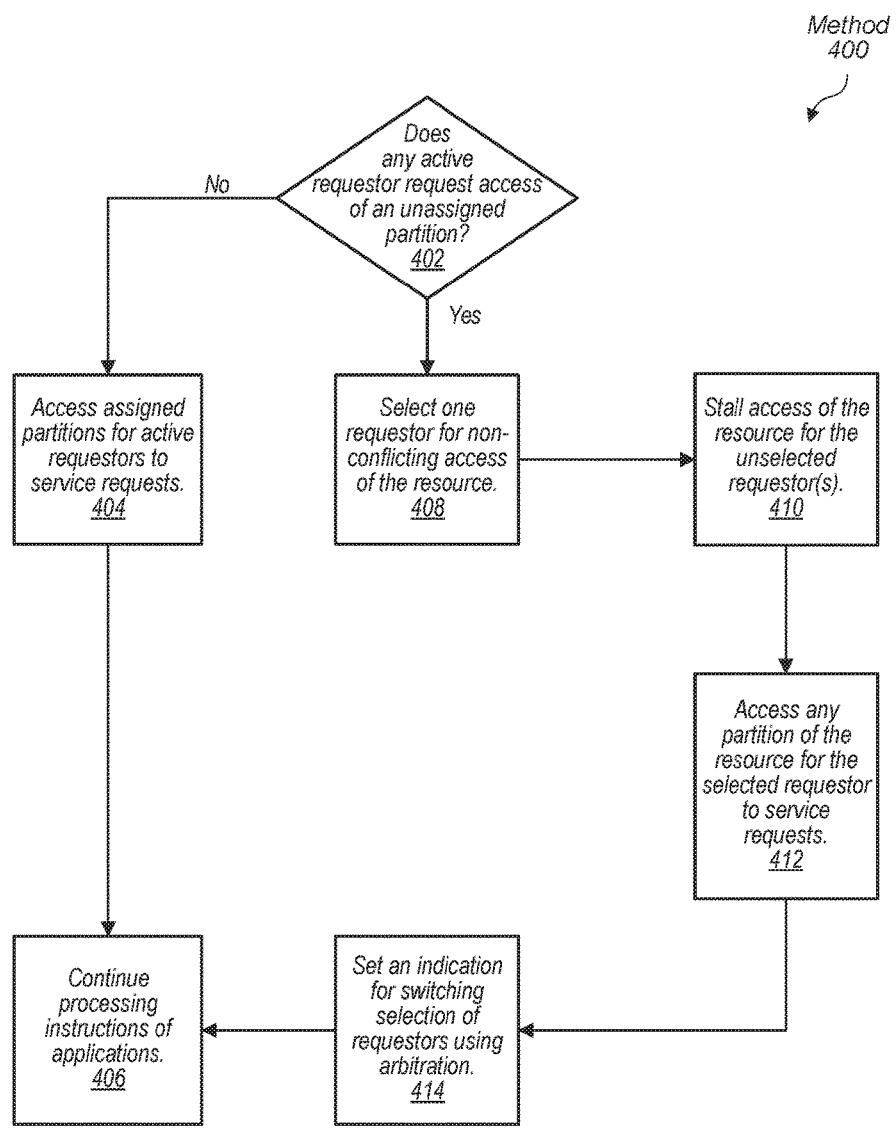
FIG. 4 is a generalized diagram of another embodiment of a method for processing access requests targeting a shared resource.

Turning now to FIG. 4, another embodiment of a method 400 for processing access requests targeting a shared resource is shown. Multiple requestors have been assigned to partitions within a shared resource. As described earlier, the requestors generate access requests identifying one of the partitions. If no generated access requests target an unassigned partition ("no" branch of the conditional block 402), then the access requests are serviced based on accessing the assigned partitions (block 404). Each access request is permitted to access its assigned partition. In various embodiments, unshared partitions are accessed simultaneously. The processing of the instructions continue (block 406) and the requestors generate access requests.

If any generated access request targets an unassigned partition ("yes" branch of the conditional block 402), then one requestor is selected for non-conflicting access of the shared resource (block 408). In various embodiments, the selected requestor is the requestor that generated the access request targeting the unassigned partition. In other embodiments, the selected requestor is the requestor which is currently the least-recently-selected requestor. In some embodiments, being the least-recently-selected requestor is based on time since the last access request was serviced for the requestor. In other embodiments, being the least-recently-selected requestor is based on a number of access requests serviced for the requestor. In some embodiments, selection is further based on an encoded priority, an ID of the requestor, identification of the operations being processed by computational units associated with the requestor and so forth.

The unselected requestors are stalled (block 410). In some embodiments, stalling includes preventing the unselected requestors from sending access requests for the shared resource. In other embodiments, stalling includes not selecting access requests stored in a request queue from the unselected requestors. In some embodiments, an ID of the unselected requestors is used to identify the access requests to ignore in the queue.

Any partition in the shared resource is available for access by the access requests generated by the selected requestor (block 412). Access requests generated by the selected requestor have exclusive access to the shared resource for a given duration of time. As described earlier, in some embodiments, the given duration is measured based on a number of clock cycles. In other embodiments, the given duration is measured based on a number of access requests. In various embodiments, the given duration is programmable. In some embodiments, the given duration is further based on an encoded priority, an identifier (ID) of the requestor, an ID of a destination for the response data, a least-recently-selected scheme, and so forth.

When the given duration is reached, an indication is set to switch selection of requestors using arbitration. The currently selected requestor is deselected and stalled. Another active requestor is selected based on the arbitration criteria used earlier such as the criteria described for the selecting step in block 408. The selection based on arbitration logic continues until the current workload is completed or a reset is forced. The processing of the instructions continue (block 406) and the requestors generate access requests. As can be seen from the above, the access requests are processed in one of two modes. If no generated access requests target an unassigned partition, then processing continues in a first mode where the assigned partitions are available for servicing the access requests. However, if any generated access request targets an unassigned partition, then processing switches to a second mode where the requestors are selected for exclusive access to the entire shared resource.

Figure 5:
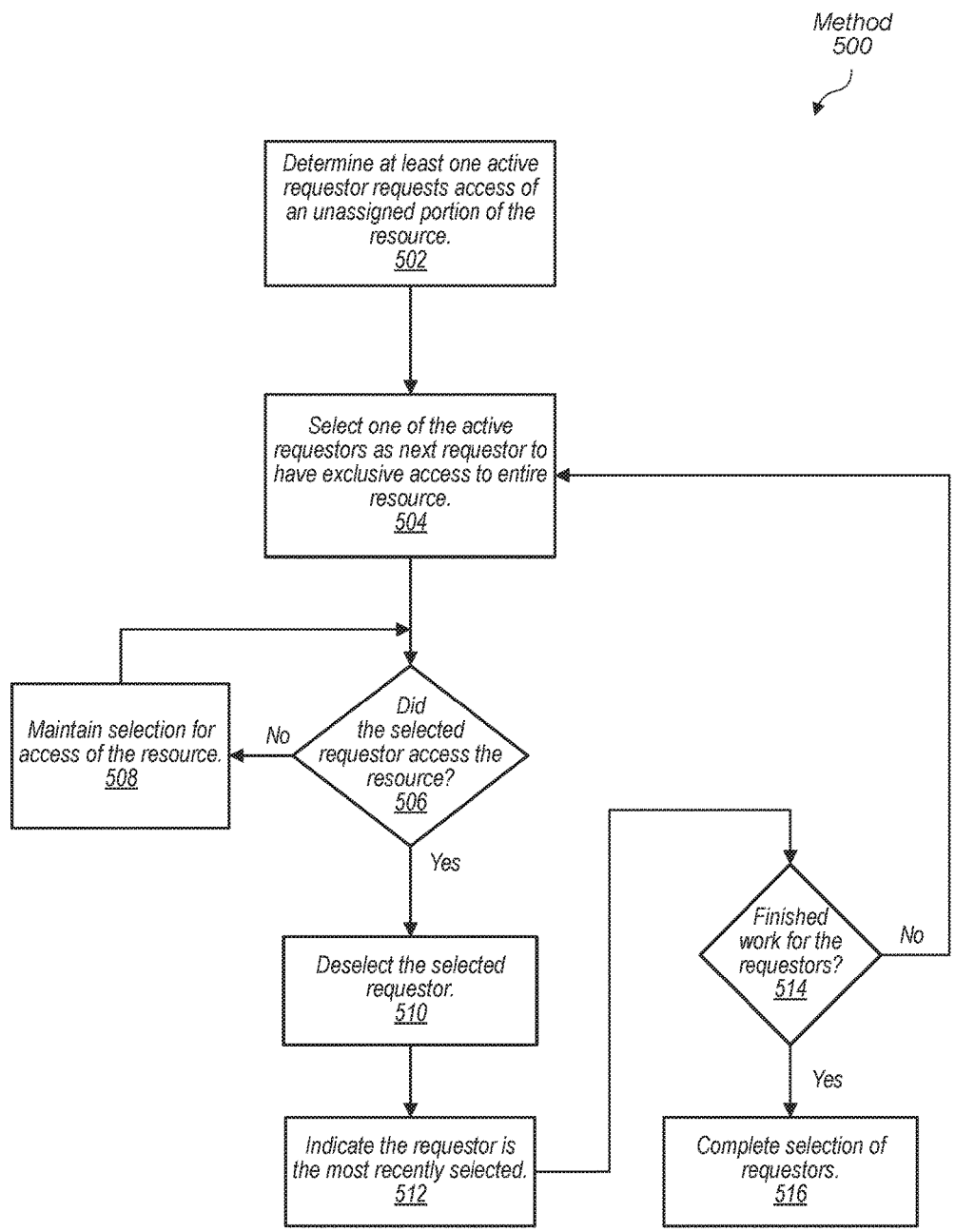
FIG. 5 is a generalized diagram of one embodiment of a method for selecting sources of access requests for use of a shared resource.

Turning now to FIG. 5, a generalized block diagram of one embodiment of a method 500 for selecting sources of access requests for use of a shared resource is shown. Multiple requestors have been assigned to partitions within a shared resource. As described earlier, the requestors generate access requests identifying one of the partitions. It is determined at least one active requestor requests access of an unassigned partition of the resource (block 502). One of the active requestors is selected as the next requestor to have exclusive access to entire resource (block 504). As described earlier, many factors are considered for selection such as a least-recently-selected scheme, an encoded priority, a number of pending access requests, a number of access requests already serviced, an indication of the computation being performed by an associated computational unit, an age of current outstanding requests and so forth.

In various embodiments, the selected requestor has exclusive access of each partition of the shared resource for a given duration. As described earlier, the given duration is based on a variety of factors. If the selected requestor did not access the shared resource such as for the given duration ("no" branch of the conditional block 506), then the selected requestor maintains selection and continues to access the shared resource with exclusive access (block 508). However, if the selected requestor did access the shared resource for the given duration ("yes" branch of the conditional block 506), then the selected requestor is deselected (block 510).

An indication is set indicating the requestor is the most-recently-selected requestor (block 512). If the workload for the requestors is not yet completed ("no" branch of the conditional block 514), then control flow of method 500 returns to block 504 where another requestor is selected for exclusive access to the shared resource. If the workload for the requestors is completed ("yes" branch of the conditional block 514), then selection of the requestors is also completed (block 516). Should another workload be assigned to the requestors, in some embodiments, the mode of operation resets to providing access to only assigned partitions of the shared resource.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
    a shared resource comprising a plurality of partitions;
    a plurality of requestors, each assigned to a different partition of the plurality of partitions of the shared resource, each configured to generate a request to the plurality of partitions; and
    a controller coupled to the shared resource, wherein in response to receiving a plurality of requests from a plurality of active requestors of the plurality of requestors for access to the shared resource, the controller is configured to:
        in response to determining no active requestor targets an unassigned partition, provide simultaneous access to partitions assigned to the plurality of active requestors; and
        in response to determining an active requestor targets an unassigned partition:
            select a first requestor of the plurality of active requestors;
            provide the first requestor with access to all partitions of the plurality of partitions; and
            stall access to the shared resource for each of the plurality of requestors other than the first requestor when providing the first requestor with access to all partitions.

2. The computing system as recited in claim 1, wherein the first requestor is not the active requestor targeting the unassigned partition.

3. The computing system as recited in claim 1, wherein the first requestor is a least recently selected active requestor of the plurality of requestors.

4. The computing system as recited in claim 1, wherein the controller is further configured to deselect the first requestor responsive to:
    determining completion of a given number of access requests for the first requestor; and
    determining the plurality of requestors have more access requests.

5. The computing system as recited in claim 4, wherein the given number of access requests is a number of access requests serviced within a single clock cycle.

6. The computing system as recited in claim 4, wherein the controller is further configured to:
   stall access of the shared resource for the first requestor; and
   mark the first requestor as the most recently selected active requestor of the plurality of requestors.

7. The computing system as recited in claim 6, wherein the controller is further configured to:
   select a second requestor different from the first requestor of the plurality of requestors;
   remove the stall for the selected second requestor; and
   provide the second requestor with access to all partitions of the plurality of partitions.

8. The computing system as recited in claim 1, wherein the shared resource is a local data store in a graphics processing unit and each of the plurality of requestors is a single instruction multiple data (SIMD) compute unit.

9. A method comprising:
   assigning each of a plurality of requestors to a different partition of a plurality of partitions of a shared resource, each configured to generate a request to the plurality of partitions;
   in response to receiving a plurality of requests from a plurality of active requestors of the plurality of requestors for access to the shared resource:
      in response to determining no active requestor targets an unassigned partition, providing simultaneous access to partitions assigned to the plurality of active requestors; and
      in response to determining an active requestor targets an unassigned partition:
         selecting a first requestor of the plurality of active requestors;
         providing the first requestor with access to all partitions of the plurality of partitions; and
         stalling access to the shared resource for each of the plurality of requestors other than the first requestor when providing the first requestor with access to all partitions.

10. The method as recited in claim 9, wherein the first requestor is not the active requestor targeting the unassigned partition.

11. The method as recited in claim 9, wherein the first requestor is a least recently selected active requestor of the plurality of requestors.

12. The method as recited in claim 9, further comprising deselecting the first requestor responsive to:
   determining completion of a given number of access requests for the first requestor; and
   determining the plurality of requestors have more access requests.

13. The method as recited in claim 12, wherein the given number of access requests is a number of access requests serviced within a single clock cycle.

14. The method as recited in claim 12, further comprising:
   stalling access of the shared resource for the first requestor; and
   marking the first requestor as the most recently selected active requestor of the plurality of requestors.

15. The method as recited in claim 14, further comprising:
   selecting a second requestor different from the first requestor of the plurality of requestors;
   removing the stall for the selected second requestor; and
   permitting access of any of the plurality of partitions for the second requestor.

16. The method as recited in claim 9, wherein the shared resource is a local data store in a graphics processing unit and each of the plurality of requestors is a single instruction multiple data (SIMD) compute unit.

17. A controller comprising:
   a first interface coupled to a shared resource comprising a plurality of partitions;
   a second interface coupled to a plurality of requestors, each assigned to a different partition of the plurality of partitions of the shared resource, each configured to generate a request to the plurality of partitions; and
   a control unit; and
   wherein in response to receiving a plurality of requests from a plurality of active requestors of the plurality of requestors for access to the shared resource, the control unit is configured to:
      in response to determining no active requestor targets an unassigned partition, provide simultaneous access to partitions assigned to the plurality of active requestors; and
      in response to determining an active requestor targets an unassigned partition:
         select a first requestor of the plurality of active requestors;
         provide the first requestor with access to all partitions of the plurality of partitions; and
         stall access to the shared resource for each of the plurality of requestors other than the first requestor when providing the first requestor with access to all partitions.

18. The controller as recited in claim 17, wherein the first requestor is not the active requestor targeting the unassigned partition.

19. The controller as recited in claim 17, wherein the control unit is further configured to deselect the first requestor responsive to:
   determining completion of a given number of access requests for the first requestor; and
   determining the plurality of requestors have more access requests.

20. The controller as recited in claim 19, wherein the control unit is further configured to:
   stall access of the shared resource for the first requestor; and
   mark the first requestor as the most recently selected active requestor of the plurality of requestors.

* * * * *